US007885766B2

(12) United States Patent
Sugimoto et al.

(10) Patent No.: US 7,885,766 B2
(45) Date of Patent: Feb. 8, 2011

(54) SUBJECT AND ONCOMING VEHICLE DEPARTURE DETERMINATION AND COLLISION AVOIDANCE APPARATUS

(75) Inventors: Yoichi Sugimoto, Utsunomiya (JP); Yoshihiro Urai, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 987 days.

(21) Appl. No.: 11/264,147

(22) Filed: Nov. 2, 2005

(65) Prior Publication Data
US 2006/0111842 A1    May 25, 2006

(30) Foreign Application Priority Data
Nov. 22, 2004    (JP)    ............... 2004-337533

(51) Int. Cl.
    *G08G 1/16* (2006.01)
(52) U.S. Cl. .................... 701/301; 701/26; 701/302
(58) Field of Classification Search ............ 701/45, 701/301; 340/436, 438, 903; 180/274
    See application file for complete search history.

(56) References Cited

U.S. PATENT DOCUMENTS

| 4,802,096 | A | * | 1/1989 | Hainsworth et al. ......... 701/301 |
| 5,249,157 | A | * | 9/1993 | Taylor ....................... 340/903 |
| 5,541,590 | A | * | 7/1996 | Nishio ....................... 340/903 |
| 5,572,428 | A | * | 11/1996 | Ishida et al. ................ 701/301 |
| 5,986,601 | A | * | 11/1999 | Sugimoto ..................... 342/70 |
| 6,269,307 | B1 | * | 7/2001 | Shinmura et al. ............. 701/301 |
| 6,269,308 | B1 | * | 7/2001 | Kodaka et al. ............... 701/301 |
| 6,314,348 | B1 | * | 11/2001 | Winslow ....................... 701/23 |
| 6,317,692 | B2 | * | 11/2001 | Kodaka et al. ............... 701/301 |
| 6,317,693 | B2 | * | 11/2001 | Kodaka et al. ............... 701/301 |
| 6,370,475 | B1 | * | 4/2002 | Breed et al. ................. 701/301 |
| 6,408,247 | B1 | * | 6/2002 | Ichikawa et al. ............. 701/301 |

(Continued)

FOREIGN PATENT DOCUMENTS

JP    2000-057495    2/2000

(Continued)

OTHER PUBLICATIONS

Dictionary.com, "angle," in Dictionary.com Unabridged (v 1.1). Source location: Random House, Inc. http://dictionary.reference.com/browse/angle. Available: http://dictionary.reference.com. Accessed: Mar. 4, 2009.*

*Primary Examiner*—Thomas G Black
*Assistant Examiner*—Sze-Hon Kong
(74) *Attorney, Agent, or Firm*—Arent Fox LLP (57) ABSTRACT

A vehicle departure determination apparatus includes: an object detection device which detects objects present in a direction of travel of a subject vehicle, and detects a relative position and relative speed of the objects and the subject vehicle; a running state detection device which detects a running state of the subject vehicle; a speed detection device which detects a speed of the subject vehicle; an oncoming vehicle determination device which determines whether any of the objects serving as oncoming vehicles for the subject vehicle are present, based on the relative speed detected by the object detection device, and the speed of the subject vehicle detected by the speed detection device; and a departure determination device which determines whether or not the subject vehicle has departed from an appropriate route for the subject vehicle, or the oncoming vehicle has departed from an appropriate route for the oncoming vehicle.

7 Claims, 7 Drawing Sheets

U.S. PATENT DOCUMENTS

| | | | |
|---|---|---|---|
| 6,480,769 B1* | 11/2002 | Kageyama | 701/23 |
| 6,556,133 B2* | 4/2003 | Ogura | 340/435 |
| 6,567,737 B2* | 5/2003 | Nakamura et al. | 701/96 |
| 6,571,176 B1* | 5/2003 | Shinmura et al. | 701/301 |
| 6,721,659 B2* | 4/2004 | Stopczynski | 701/301 |
| 6,853,311 B2* | 2/2005 | Taniguchi | 340/903 |
| 7,109,850 B2* | 9/2006 | Kawazoe et al. | 340/425.5 |
| 7,124,027 B1* | 10/2006 | Ernst et al. | 701/301 |
| 7,302,325 B2* | 11/2007 | Kudo | 701/36 |
| 7,788,033 B2* | 8/2010 | Isaji et al. | 701/301 |
| 2005/0090983 A1* | 4/2005 | Isaji et al. | 701/301 |
| 2005/0125121 A1* | 6/2005 | Isaji et al. | 701/36 |
| 2010/0002081 A1* | 1/2010 | Pawlicki et al. | 348/148 |

FOREIGN PATENT DOCUMENTS

| | | |
|---|---|---|
| JP | 2000-066726 A | 3/2000 |
| JP | 2001-199296 A | 7/2001 |
| JP | 2002-225656 A | 8/2002 |
| JP | 2005-149021 A | 6/2005 |

* cited by examiner

SUBJECT AND ONCOMING VEHICLE DEPARTURE DETERMINATION AND COLLISION AVOIDANCE APPARATUS

BACKGROUND OF THE INVENTION

Priority is claimed on Japanese Patent Application No. 2004-337533, filed Nov. 22, 2004, the content of which is incorporated herein by reference.

FIELD OF THE INVENTION

The present invention relates to a departure determination apparatus for a vehicle.

DESCRIPTION OF RELATED ART

In a known conventional vehicle travel safety device, an appropriate course for a subject vehicle which allows the subject vehicle and an oncoming vehicle to pass by each other, is set based on the relative positions and relative distances of the oncoming vehicle and the subject vehicle as detected by radar or the like, as well as a predetermined appropriate lateral distance set in advance, and based on this appropriate course, the degree of risk of contact between the subject vehicle and the oncoming vehicle is calculated, and a contact avoidance operation involving the subject vehicle and the oncoming vehicle is executed according to the calculated degree of risk (for example Japanese Unexamined Patent Application, First Publication No. 2000-57495).

Incidentally, in such a conventional vehicle travel safety device, the appropriate course for the subject vehicle is set based on a position which is a predetermined appropriate lateral distance away from the position of the oncoming vehicle. In other words, this assumes a situation where the oncoming vehicle is traveling an appropriate course, and the subject vehicle departs from an appropriate course. However, there is also a likelihood of contact between the oncoming vehicle and the subject vehicle in a situation where the subject vehicle is traveling an appropriate course, and the oncoming vehicle departs from an appropriate course. Accordingly, it is a desirable feature if in each different situation a contact avoidance operation appropriate to that situation is executed.

In accordance with the above circumstances, an object of the present invention is to provide a vehicle departure determination apparatus that is capable of performing an appropriate contact avoidance operation when there is a possibility of contact occurring between a subject vehicle and an oncoming vehicle.

SUMMARY OF THE INVENTION

In order to achieve this object, a vehicle departure determination apparatus according to the present invention includes: an object detection device which detects objects present in a direction of travel of a subject vehicle, and detects a relative position and relative speed of the objects and the subject vehicle; a running state detection device which detects a running state of the subject vehicle; a speed detection device which detects a speed of the subject vehicle; an oncoming vehicle determination device which determines whether any of the objects serving as oncoming vehicles for the subject vehicle are present, based on the relative speed detected by the object detection device, and the speed of the subject vehicle detected by the speed detection device; and a departure determination device which determines whether or not the subject vehicle has departed from an appropriate route for the subject vehicle, or the oncoming vehicle has departed from an appropriate route for the oncoming vehicle.

According to the vehicle departure determination apparatus, by determining whether or not the subject vehicle has departed from the appropriate route for the subject vehicle, or the oncoming vehicle has departed from the appropriate route for the oncoming vehicle, it is possible to execute appropriate vehicle control according to the departure state.

A construction may also be employed in which the vehicle departure determination apparatus further includes: a subject vehicle travel locus estimation device which estimates a travel locus of the subject vehicle based on detection results of the running state detection device; and an oncoming vehicle travel locus estimation device which estimates a travel locus of the oncoming vehicle based on a change over time of the relative position detected by the object detection device, wherein the departure determination device determines whether or not the subject vehicle has departed from the appropriate route for the subject vehicle, or the oncoming vehicle has departed from the appropriate route for the oncoming vehicle, based on an angle formed by the travel locus of the subject vehicle estimated by the subject vehicle travel locus estimation device and the travel locus of the oncoming vehicle estimated by the oncoming vehicle travel locus estimation device.

According to the vehicle departure determination apparatus, it is possible to readily determine whether or not the subject vehicle has departed from the appropriate route for the subject vehicle or the oncoming vehicle has departed from the appropriate route for the oncoming vehicle, according to the angle formed by the travel locus of the subject vehicle and the travel locus of the oncoming vehicle. For example, when making the determination based on the angle formed by the direction of travel of the oncoming vehicle on the travel locus and the direction of travel of the subject vehicle on the travel locus, it can be readily determined that the oncoming vehicle has departed as this angle decreases, and it can be readily determined that the subject vehicle has departed as this angle increases.

A construction may also be employed in which the vehicle departure determination apparatus further includes: a subject vehicle travel locus estimation device which estimates a travel locus of the subject vehicle based on detection results of the running state detection device; and a lateral deviation calculation device which calculates a lateral deviation of the oncoming vehicle relative to a travel locus of the subject vehicle, based on the travel locus of the subject vehicle estimated by the subject vehicle travel locus estimation device and the relative position detected by the object detection device, wherein the departure determination device determines whether or not the subject vehicle has departed from the appropriate route for the subject vehicle, or the oncoming vehicle has departed from the appropriate route for the oncoming vehicle, by determining whether or not the lateral deviation calculated by the lateral deviation calculation device occurs on a side approaching the travel locus of the subject vehicle, or whether or not the lateral deviation occurs on a side away from the travel locus of the subject vehicle.

According to the vehicle departure determination apparatus, it is possible to readily determine whether or not the subject vehicle has departed from the appropriate route for the subject vehicle or the oncoming vehicle has departed from the appropriate route for the oncoming vehicle, according to the lateral deviation of the oncoming vehicle relative to the travel locus of the subject vehicle. For example, when the lateral deviation occurs on the side approaching the travel locus of the subject vehicle, it is easy to determine that the oncoming vehicle has departed, and when the lateral deviation occurs on the side away from the travel locus of the subject vehicle, it is easy to determine that the subject vehicle has departed.

A construction may also be employed in which the departure determination device determines that the oncoming vehicle has departed from the appropriate route for the oncoming vehicle, when the lateral deviation occurs on the side approaching the travel locus of the subject vehicle, and changes in a reducing trend over time, and determines that the subject vehicle has departed from the appropriate route for the subject vehicle, when the lateral deviation occurs on the side away from the travel locus of the subject vehicle, and changes in a reducing trend over time.

According to the vehicle departure determination apparatus, it is possible to readily and accurately determine whether or not the subject vehicle has departed from the appropriate route for the subject vehicle, or the oncoming vehicle has departed from the appropriate route for the oncoming vehicle, according to the lateral deviation of the oncoming vehicle relative to the travel locus of the subject vehicle.

A construction may also be employed in which the vehicle departure determination apparatus further includes a driver state estimation device which estimates a state of a driver of the subject vehicle, wherein the departure determination device determines that the oncoming vehicle has departed from the appropriate route for the oncoming vehicle, when the state of the driver estimated by the driver state estimation device is normal, and determines that the subject vehicle has departed from the appropriate route for the subject vehicle, when the state of the driver estimated by the driver state estimation device is not normal.

According to the vehicle departure determination apparatus, it is possible to readily determine whether or not the subject vehicle has departed from the appropriate route for the subject vehicle, or the oncoming vehicle has departed from the appropriate route for the oncoming vehicle, according to the state of the driver of the subject vehicle.

A construction may also be employed in which the vehicle departure determination apparatus further includes a subject vehicle turning state detection device which detects a turning state of the subject vehicle based on detection results of the driver state estimation device, wherein the departure determination device is set so that in the turning state of the subject vehicle detected by the subject vehicle turning state detection device, a determination is more readily made that the subject vehicle has departed from the appropriate route for the subject vehicle, as a degree of turning in a direction approaching the oncoming vehicle increases, and a determination is more readily made that the oncoming vehicle has departed from the appropriate route for the oncoming vehicle, as a degree of turning in a direction away from the oncoming vehicle increases.

According to the vehicle departure determination apparatus, it is possible to readily determine whether or not the subject vehicle has departed from the appropriate route for the subject vehicle, or the oncoming vehicle has departed from the appropriate route for the oncoming vehicle, according to the turning state of the subject vehicle.

A construction may also be employed in which the vehicle departure determination apparatus further includes: a contact prediction device which predicts the likelihood of contact between the subject vehicle and the oncoming vehicle; and an operation device which operates a contact avoidance device provided in the subject vehicle, when the contact prediction device determines that there is a likelihood of contact, wherein the operation device, when the departure determination device has determined that the oncoming vehicle has departed from the appropriate route, either suppresses the operation of the contact avoidance device in comparison to cases when such a determination is not made, or prohibits the operation of said contact avoidance device.

According to the vehicle departure determination apparatus, it is possible to avoid contact by means of a contact avoidance operation executed in the oncoming vehicle, by suppressing or prohibiting the operation of the contact avoidance control in the subject vehicle in a case where it is determined that the oncoming vehicle has departed from the appropriate route for the oncoming vehicle.

DETAILED DESCRIPTION OF THE INVENTION

An embodiment of the vehicle departure determination apparatus of the present invention is described below with reference to the appended drawings.

Figure 1:
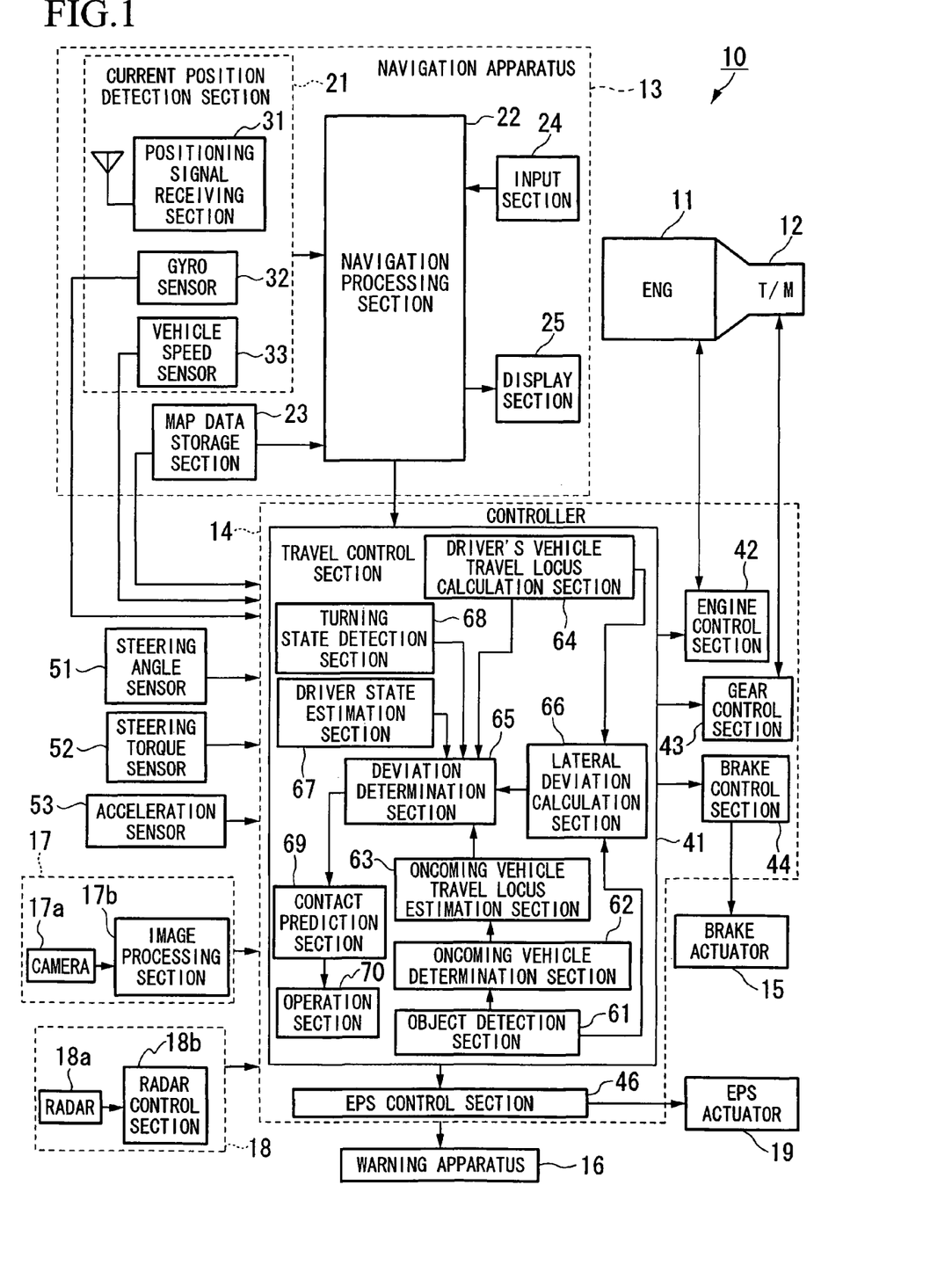
FIG. 1 is a functional block diagram showing the construction of a vehicle departure determination apparatus according to an embodiment of the present invention.

As shown in FIG. 1, a vehicle departure determination apparatus 10 according to the present embodiment is installed in a vehicle in which driving force from an internal combustion engine 11 is transmitted to the driving wheels of the vehicle via a transmission (T/M) 12, such as an automatic transmission (AT) or a continuously variable transmission (CVT). Furthermore, this vehicle departure determination apparatus 10 includes a navigation apparatus 13, a control apparatus 14, a brake actuator 15, a warning apparatus 16, an imaging apparatus 17 and a radar apparatus 18 serving as external sensors, and an EPS actuator 19.

The imaging apparatus 17 includes a camera 17a having a CCD camera or C-MOS camera or the like which is capable of capturing images in the visible light and infrared spectrums, and an image processing section 17b. The camera 17a is provided on the inside of the windscreen in a position near the room mirror, for example, and is capable of capturing through the windscreen a predetermined detection area outside the subject vehicle, to the front in the traveling direction.

The image processing section 17b performs predetermined image processing on the images captured by the camera 17a, such as filtering or binary processing, thereby generating image data which is output to the control apparatus 14.

The radar apparatus 18 includes a radar 18a which uses a laser beam or millimeter wave, for example, and a radar control section 18b. The radar 18a is provided in the nose of the vehicle body or in the interior of the vehicle near the windscreen, for example. This radar 18a emits a transmitted signal such as a laser beam or millimeter wave in the appropriate direction for detection (for example, forward in the travel direction of the vehicle) according to control commands input from the control apparatus 14 to the radar control section 18b. In addition, this radar 18a receives a reflected signal produced when the transmitted signal is reflected by an object outside the vehicle (object for detection), generates a beat signal by combining the reflected signal and the transmitted signal, and outputs the generated signal to the control apparatus 14.

The navigation apparatus 13 includes, for example, a current position detection section 21, a navigation processing section 22, a map data storage section 23, an input section 24, and a display section 25.

The current position detection section 21 includes: a positioning signal receiving section 31 which receives a positioning signal such as a GPS (Global Positioning System) signal whereby the position of the vehicle is detected using a satellite, or a D (Differential) GPS signal which yields improved positioning accuracy by using appropriate base stations to correct errors in the GPS signal; a gyro sensor 32 which detects the orientation of the subject vehicle in the horizontal plane and the angle of inclination relative to the vertical direction (for example the angle of inclination of the subject vehicle along the front to back axis relative to the vertical direction, or the yaw angle which is the angle of rotation of the center of gravity of the subject vehicle about the vertical axis), and variation in the angle of inclination (for example the yaw rate); and a vehicle speed sensor 33 which detects the speed of the subject vehicle (vehicle speed). In the current position detection section 21, the current position of the subject vehicle is calculated from the positioning signals received, or by way of calculation processing for autonomous navigation based on the detection signals such as the vehicle speed and yaw rate.

The map data storage section 23 may be a magnetic disk device such as a hard disk, or a computer readable storage medium, for example an optical disk such as CD-ROM, CD-R, MO or DVD. The map data storage section 23 contains road data such as road width, the angle of intersection between roads, and the shape and position of intersections, for example, to be used as map data to display on the display section 25.

The navigation processing section 22 performs map-matching based on the current position information for the subject vehicle obtained from one or both of, the positioning signals and the autonomous navigation calculation processing in the current position detection section 21, with respect to the road data acquired from the map data storage section 23 for example, and corrects the results of the position detection. In addition, the navigation processing section 22 displays the detected current position of the subject vehicle, or the appropriate vehicle position input by an operator using the input section 24 (such as a set of switches or a keyboard), on a map on the display section 25.

The navigation processing section 22 executes processing for the vehicle such as route searching or route guidance, and outputs information on the route to the destination and various additional information, to the display section 25, together with the road data acquired from the map data storage section 23.

The control apparatus 14 includes a travel control section 41, an engine control section 42, a gear control section 43, a brake control section 44, and an EPS control section 46. To the control apparatus 14 are input a variety of detection signals which are output from; a steering angle sensor 51 which detects the direction and magnitude of the steering angle applied by the driver, a steering torque sensor 52 which detects the steering torque applied by the driver, and an acceleration sensor 53 which detects the acceleration produced in the subject vehicle (for example the forward or reverse acceleration in the forward or reverse direction of the vehicle or the lateral acceleration in the lateral direction of the vehicle).

The travel control section 41 includes; an object detection section 61, an oncoming vehicle determination section 62, an oncoming vehicle travel locus estimation section 63, a subject vehicle travel locus calculation section 64, a departure determination section 65, a lateral deviation calculation section 66, a driver state estimation section 67, a turning state detection section 68, a contact prediction section 69, and an operation section 70.

The object detection section 61 detects still and moving objects within the respective detection areas of the camera 17a or radar 18a in the direction of travel of the subject vehicle, based on the image data input from the imaging apparatus 17 or the beat signal output from the radar apparatus 18, and detects the relative positions, relative distances and relative speeds of the detected objects and the subject vehicle.

The oncoming vehicle determination section 62 determines whether or not an oncoming vehicle in relation to the subject vehicle, that is an object (moving object) in the opposite lane to the lane on which the subject vehicle is traveling, is present in the objects detected by the object detection section 61.

The oncoming vehicle travel locus estimation section 63 estimates the travel locus of the oncoming vehicle based on the change over time of the relative position as detected by the object detection section 61.

The subject vehicle travel locus calculation section 64 calculates the travel locus of the subject vehicle based for example on the change over time of the current position of the subject vehicle as detected by the current position detection section 21, or the traveling state of the subject vehicle (for example, the current speed VP of the subject vehicle as detected by the vehicle speed sensor 33 and the yaw rate ω of the subject vehicle as detected by the gyro sensor 32). When the subject vehicle drives around a curve, for example, the turning radius R of the curve is calculated by the following equation (1):

$$\text{Radius } R = \frac{VP}{\omega} \qquad (1)$$

The departure determination section 65 determines whether or not the subject vehicle or the oncoming vehicle has departed from an appropriate route that would allow the vehicles to pass by each other.

Figure 2:
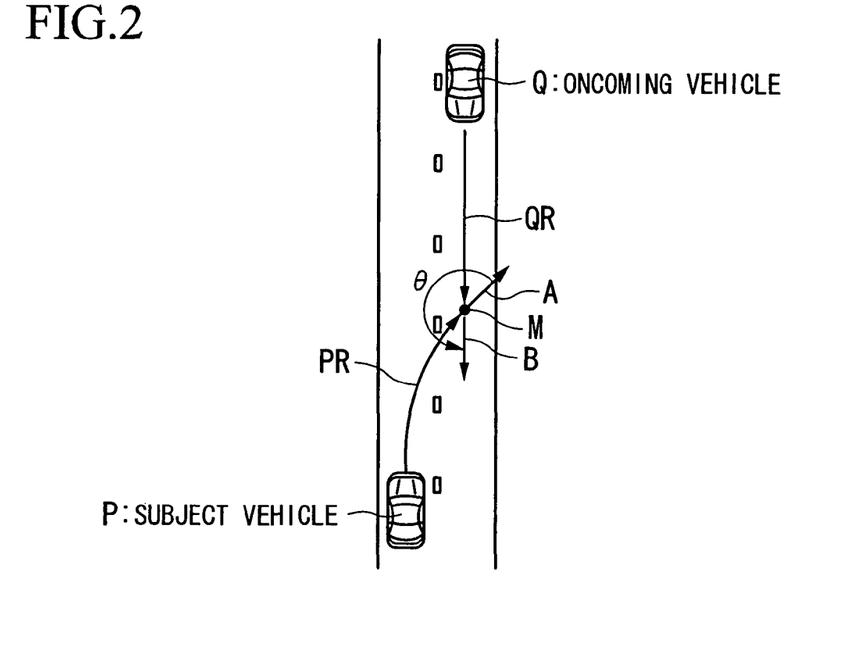
FIG. 2 is a plan view showing an example of the relative positions of a subject vehicle and an oncoming vehicle in a case where on a straight road, the subject vehicle departs into the opposite lane.
Figure 3:
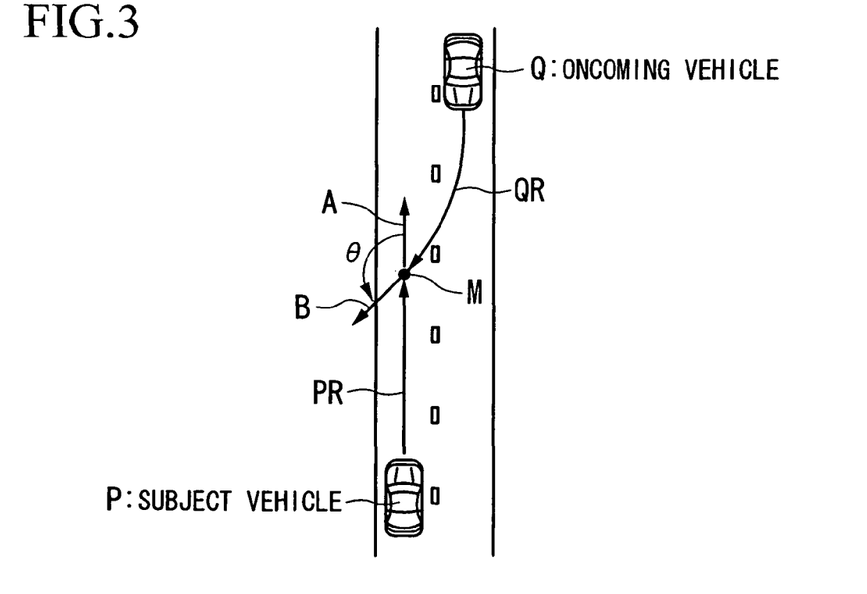
FIG. 3 is a plan view showing an example of the relative positions of a subject vehicle and an oncoming vehicle in a case where on a straight road, the oncoming vehicle departs into the opposite lane.
Figure 4:
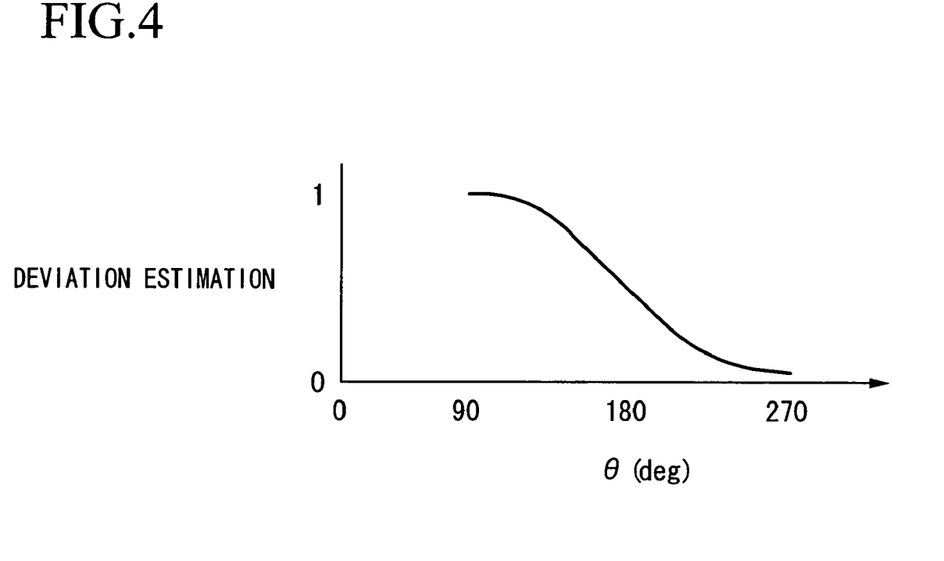
FIG. 4 is a graph showing an example of deviation estimates which change according to an angle θ formed by the motion vector B of the oncoming vehicle. Q based on the motion vector A of the subject vehicle P.

As shown in FIG. 2 through FIG. 4, for example, the departure determination section 65 determines whether or not the subject vehicle or the oncoming vehicle has departed from an appropriate route based on the angle formed by the travel locus PR of the subject vehicle P and the travel locus QR of the oncoming vehicle Q. In other words, as shown in FIG. 2, when a subject vehicle P which is traveling on a straight road departs into the opposite lane, or an oncoming vehicle Q which is traveling on a straight road departs into the opposite lane (that is the lane in which the subject vehicle P is traveling) as shown in FIG. 3, first the time of collision is calculated by dividing the relative distance between the subject vehicle P and the oncoming vehicle Q by the relative speed (=relative distance/relative speed). Then the position M, at which the subject vehicle P and the oncoming vehicle Q are closest (the closest position), is estimated based on the calculated collision time and the respective travel loci PR and PQ of the subject vehicle P and the oncoming vehicle Q. The respective motion vectors A and B of the subject vehicle P and the oncoming vehicle Q at this closest position M are then estimated, and the angle θ formed by the motion vector B is calculated on the basis of the motion vector A of the subject vehicle, for example. Then the deviation estimation is obtained by referring to a map of deviation estimates as shown in FIG. 4 which shows a reducing trend from "1" to "0" as the angle θ increases from 90° to 270°. The setting is performed according to the deviation estimation obtained (for example, the setting is performed so that a determination that the oncoming vehicle has departed is more readily made as the deviation estimation increases, and a determination that the subject vehicle has departed is more readily made as the deviation estimation decreases).

Figure 5:
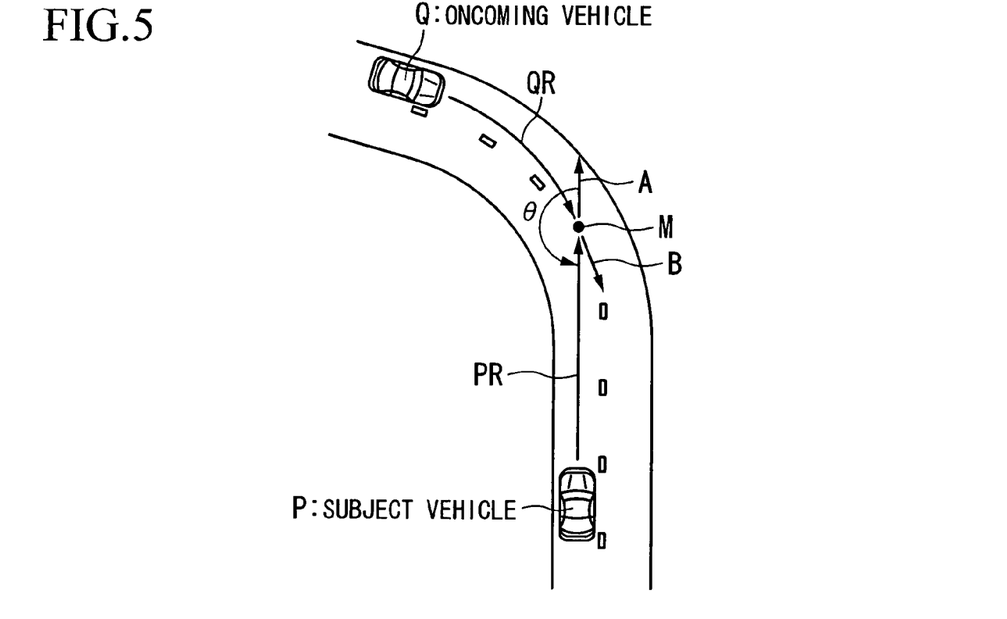
FIG. 5 is a plan view showing an example of the relative positions of a subject vehicle and an oncoming vehicle, in a case where the oncoming vehicle, which is rounding a curve, departs into the opposite lane while the subject vehicle is traveling straight.
Figure 6:
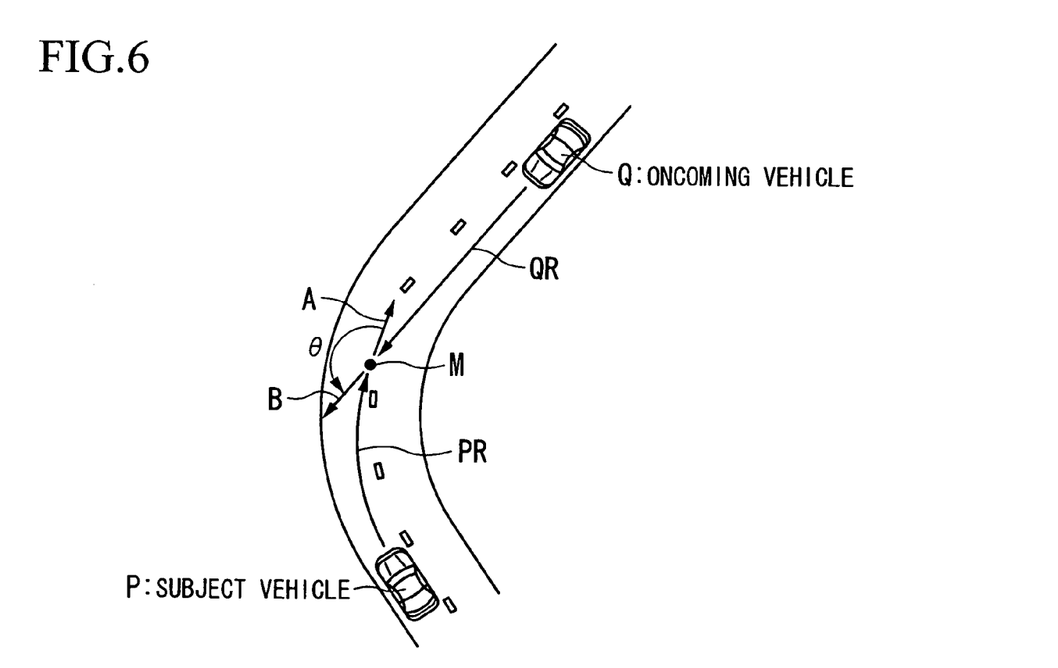
FIG. 6 is a plan view showing an example of the relative positions of a subject vehicle and an oncoming vehicle, in a case where the oncoming vehicle, which is traveling straight ahead, departs into the opposite lane while the subject vehicle is rounding a curve.

In the same manner, as shown in FIG. 5 for example, in a case where the oncoming vehicle Q is traveling around a curve while the subject vehicle P which is traveling in a straight line departs into the opposite lane, or as shown in FIG. 6 in a case where the subject vehicle P is traveling around a curve while the oncoming vehicle Q which is traveling in a straight line departs into the opposite lane (that is, the lane in which the subject vehicle P is traveling), the setting is performed so that a determination that the subject vehicle has departed is more readily made as the angle θ formed by the respective movement vectors A and B of the subject vehicle P and the oncoming vehicle Q at the closest position M increases, and a determination that the oncoming vehicle has departed is more readily made as this angle θ decreases.

The lateral deviation calculation section 66 calculates the lateral deviation e of the oncoming vehicle relative to the travel locus of the subject vehicle, that is the distance in the lateral direction of the oncoming vehicle between the travel locus of the subject vehicle and the position of the oncoming vehicle.

The departure determination section 65 determines whether or not the subject vehicle or the oncoming vehicle has departed from an appropriate route that allows the vehicles to pass by each other, according to the lateral deviation e.

Figure 7:
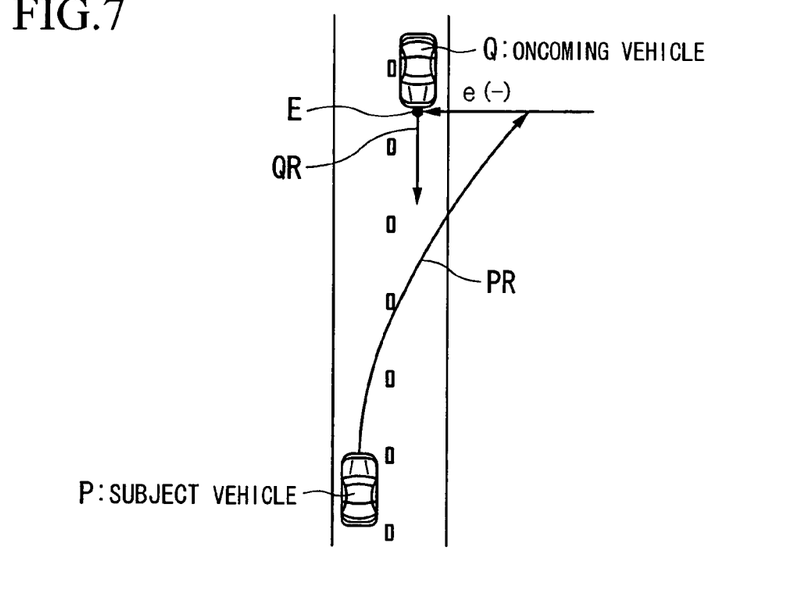
FIG. 7 is a plan view showing an example of the lateral deviation e in a case where on a straight road the subject vehicle departs into the opposite lane.
Figure 8:
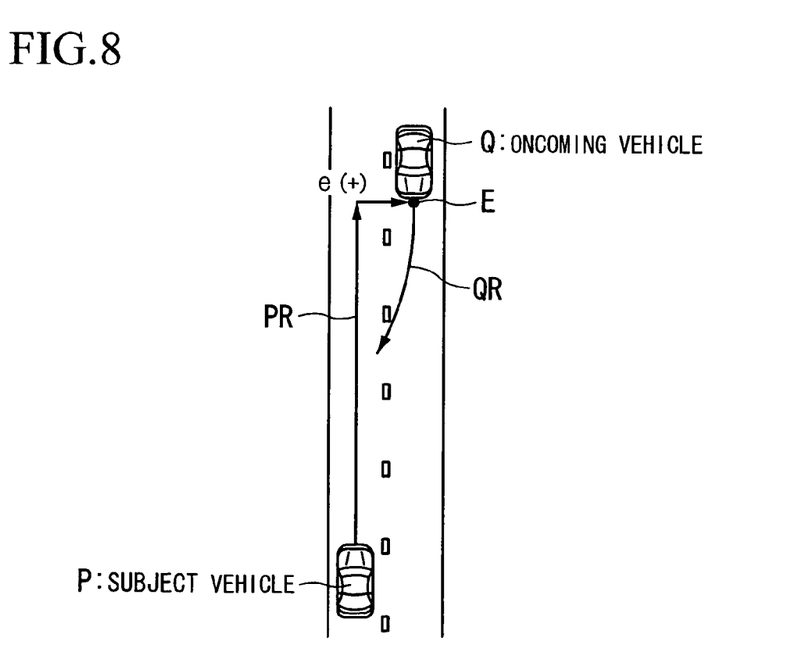
FIG. 8 is a plan view showing an example of the lateral deviation e in a case where on a straight road the oncoming vehicle departs into the opposite lane.

As shown in FIG. 7 and FIG. 8, for example, this lateral deviation e is a positive value on the opposing lane side with respect to the travel locus of the subject vehicle P.

Figure 9:
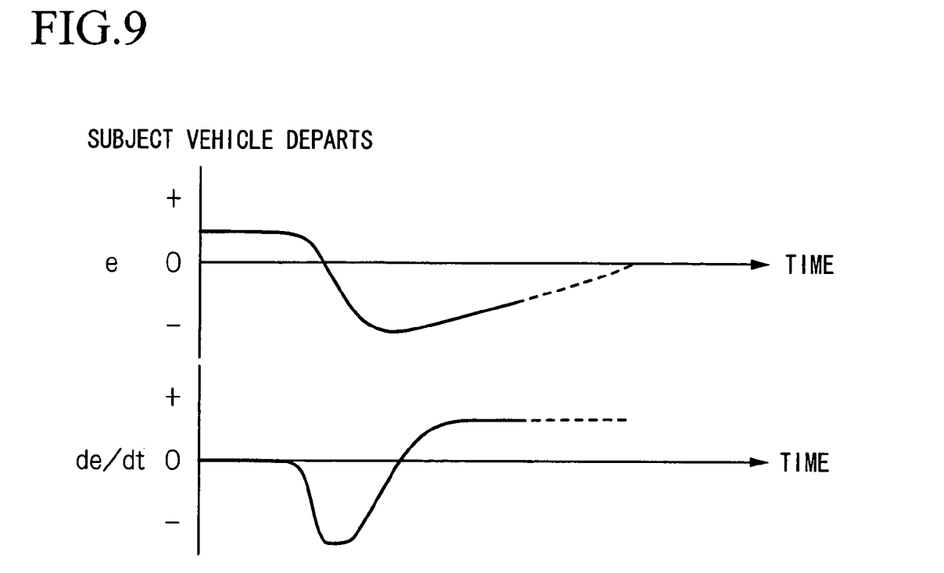
FIG. 9 is a graph showing an example of the change over time of the lateral deviation e in a case where on a straight road the subject vehicle departs into the opposite lane, and the time rate (de/dt) of the lateral deviation e.

As shown in FIG. 7 for example, in a case where the subject vehicle P departs into the opposite lane, when the subject vehicle P begins to depart as shown in FIG. 9, the lateral deviation e changes from a positive value towards a negative value in a reducing trend, and subsequently changes from a negative value towards zero in an increasing trend. Unless the subject vehicle P and the oncoming vehicle Q execute contact avoidance operations, when the lateral deviation e is increasing towards zero, the subject vehicle P and the oncoming vehicle Q will contact each other when the lateral deviation e reaches zero.

Figure 10:
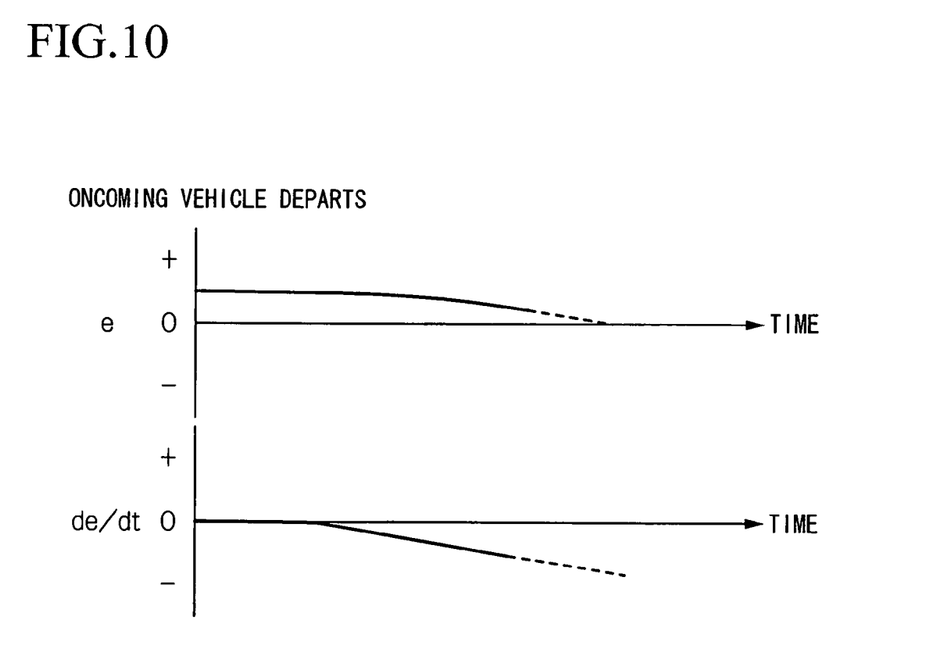
FIG. 10 is a graph showing an example of the change over time of the lateral deviation e in a case where on a straight road the oncoming vehicle departs into the opposite lane, and the time rate (de/dt) of the lateral deviation e.

As shown in FIG. 8 for example, in a case where the oncoming vehicle Q departs into the opposite lane (that is the lane in which the subject vehicle P is traveling), when the oncoming vehicle Q begins to depart, as shown in FIG. 10, the lateral deviation e changes from a positive value towards zero in a reducing trend. Unless the subject vehicle P and the oncoming vehicle Q execute contact avoidance operations, when the lateral deviation e is decreasing towards zero, the subject vehicle P and the oncoming vehicle Q will contact each other when the lateral deviation e reaches zero.

Figure 11:
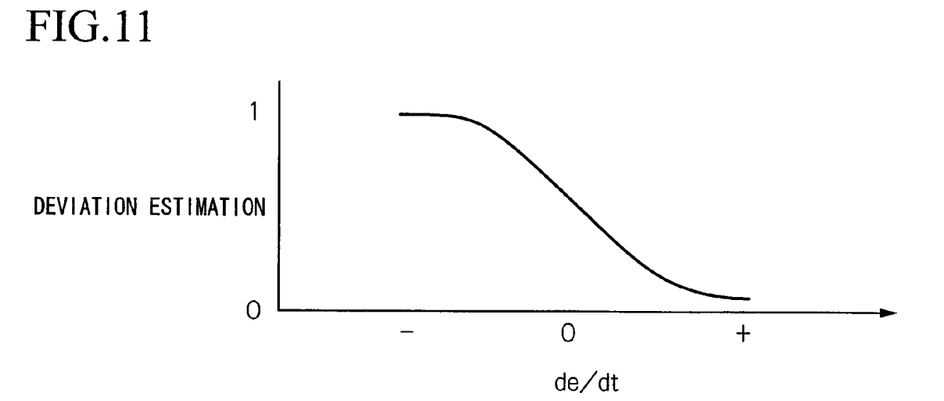
FIG. 11 is a graph showing an example of deviation estimates which change according to the time rate (de/dt) of the lateral deviation e.

The departure determination section 65 obtains the deviation estimation by referring to a map of deviation estimates as shown in FIG. 11 which shows a reducing trend from "1" to "0" as the time rate (de/dt) of the lateral deviation e increases from a negative value to a positive value. The setting is performed according to the obtained deviation estimation so that for example a determination that the oncoming vehicle has departed is more readily made as the deviation estimation increases, and a determination that the subject vehicle has departed is more readily made as the deviation estimation decreases.

The driver state estimation section 67 estimates the state of the driver of the subject vehicle, in terms of factors relating to the alertness and concentration on driving of the driver such as driver wakefulness or inattention.

For example, various detection signals such as those output from a sight line sensor (not shown in the drawings) which detects the sight line of the driver and status sensors (not shown in the drawings) which detect the period and frequency of driving tasks and changes to the running state of the vehicle (for example the vehicle drifting) are input to the driver state estimation section 67, and based on these detection signals, a determination is made as to whether or not the status of the driver is normal.

Figure 12:
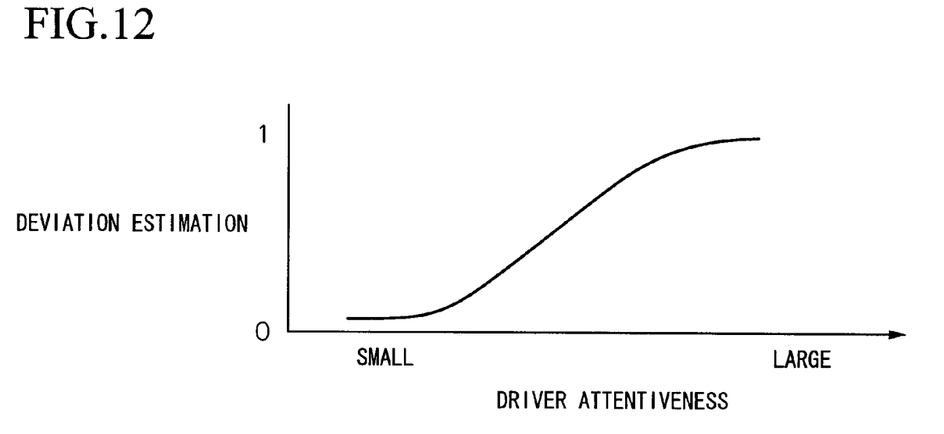
FIG. 12 is a graph showing an example of deviation estimates which change according to the alertness of the driver.

The departure determination section 65 obtains a deviation estimation by referring to a map of deviation estimates as shown in FIG. 12 which shows an increasing trend from "0" to "1" as the alertness of the driver increases. The setting is performed according to the obtained deviation estimation so that for example a determination that the oncoming vehicle has departed is more readily made as the deviation estimation increases, and a determination that the subject vehicle has departed is more readily made as the deviation estimation decreases.

The turning state detection section 68 detects the turning state of the subject vehicle, for example a turning angle where a turning direction towards the opposite lane is indicated by a negative value, based for example on; the detection signal for lateral acceleration output from the acceleration sensor 53, the detection signal for the yaw rate output from the gyro sensor 32, the detection signal for the direction and magnitude of the steering angle output from the steering angle sensor 51, and the detection signal for the steering torque output from the steering torque sensor 52.

Figure 13:
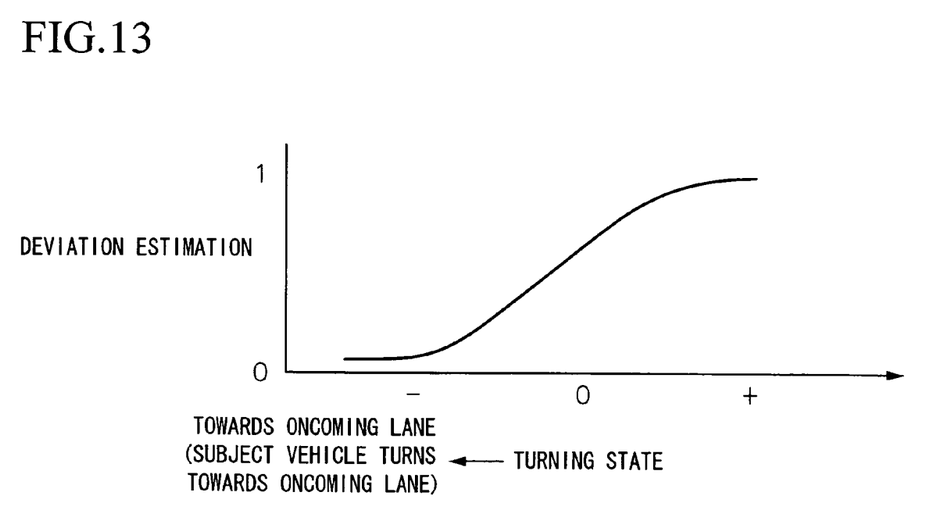
FIG. 13 is a graph showing an example of deviation estimates which change according to the turning state of the subject vehicle.

The departure determination section 65 obtains a deviation estimation by referring to a map of deviation estimates as shown in FIG. 13 which shows an increasing trend from "0" to "1" as the turning state increases from a negative value towards a positive value. The setting is performed according to the obtained deviation estimation (so that for example a determination that the oncoming vehicle has departed is more readily made as the deviation estimation increases, and a determination that the subject vehicle has departed is more readily made as the deviation estimation decreases).

The contact prediction section 69 predicts the likelihood of contact between the subject vehicle and the oncoming vehicle, based for example on the determination result by the departure determination section 65, the relative distance or relative speed between the subject vehicle and the oncoming vehicle, and the respective travel loci of the subject vehicle and the oncoming vehicle.

When a determination is made that there is a likelihood of contact, according to the predictions of the contact prediction section 69, the operation section 70 executes contact avoidance control to output an auditory warning in the form of a sound, a visual warning in the form of a display, or a tactile warning in the form of steering oscillation or the like, from the warning apparatus 16, or to output reaction torque or assist torque by the EPS actuator 19.

The operation section 70 is set so that when the departure determination section 65 determines that the oncoming vehicle has departed from the appropriate route, the operation section 70 either suppresses the operation of the contact avoidance control in comparison to cases when such a determination is not made, or prohibits the operation of the contact avoidance control, allowing contact to be avoided by means of a contact avoidance operation executed in the oncoming vehicle.

As has been described above, according to the vehicle departure determination apparatus 10 of the present embodiment, by determining whether or not the subject vehicle or the oncoming vehicle has departed from the appropriate route, it becomes possible to execute appropriate vehicle control according to the departure state. Moreover, it is possible to readily determine whether or not the subject vehicle or the oncoming vehicle has departed from an appropriate route according to; the angle formed by the travel locus of the subject vehicle and the travel locus of the oncoming vehicle, the lateral deviation of the oncoming vehicle relative to the travel locus of the subject vehicle, the state of the driver of the subject vehicle, or the turning state of the subject vehicle.

In addition, by suppressing or prohibiting the operation of the contact avoidance control of the subject vehicle when it is determined that the oncoming vehicle has departed from the appropriate route, contact can be avoided by the contact avoidance operations executed in the oncoming vehicle.

The embodiment described above uses an example in which the departure determination section 65 refers to a map of deviation estimates (FIG. 11 for example) which change according to the time rate (de/dt) of the lateral deviation e. However, the present invention is not limited to such a configuration, and the deviation estimates may be obtained by referring to a map of deviation estimates which change according to the lateral deviation e, and the time rate (de/dt) of the lateral deviation e.

While preferred a embodiment of the invention has been described and illustrated above, it should be understood that this is exemplary of the invention and is not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle departure determination apparatus comprising:
   an object detection device which detects objects present in a direction of travel of a subject vehicle, and detects a relative position and relative speed of the objects and said subject vehicle;
   a running state detection device which detects a running state of said subject vehicle;
   a speed detection device which detects a speed of said subject vehicle;
   an oncoming vehicle determination device which determines whether any of said objects serving as oncoming vehicles for said subject vehicle are present, where objects serving as oncoming vehicles are traveling in a direction of travel substantially opposite to said direction of travel of the subject vehicle, based on said relative speed detected by said object detection device, and the speed of said subject vehicle detected by said speed detection device;
   a departure determination device which determines a departure state of the subject vehicle by determining whether or not the subject vehicle has departed from an appropriate route for said subject vehicle and determines a departure state of the oncoming vehicle by determining whether or not the oncoming vehicle has departed from an appropriate route for said oncoming vehicle;
   a contact prediction device which predicts the likelihood of contact between said subject vehicle and said oncoming vehicle; and
   a contact avoidance device which performs a contact avoidance operation when the contact prediction device predicts the likelihood of the contact,
   wherein a first operation is performed by the contact avoidance device when the departure state of the subject vehicle indicates that the subject vehicle has departed from the appropriate route for said subject vehicle, and the contact avoidance device performs a second operation when the departure state of the oncoming vehicle indicates that said oncoming vehicle has departed from the appropriate route for said oncoming vehicle.

2. The vehicle departure determination apparatus according to claim 1, further comprising:
   a subject vehicle travel locus estimation device which estimates a travel locus of said subject vehicle based on detection results of said running state detection device; and
   an oncoming vehicle travel locus estimation device which estimates a travel locus of said oncoming vehicle based on a change over time of said relative position detected by said object detection device, wherein
   said departure determination device determines whether or not said subject vehicle has departed from the appropriate route for said subject vehicle, or said oncoming vehicle has departed from the appropriate route for said oncoming vehicle, based on an angle formed by the travel locus of said subject vehicle estimated by said subject vehicle travel locus estimation device and the travel locus of said oncoming vehicle estimated by said oncoming vehicle travel locus estimation device.

3. The vehicle departure determination apparatus according to claim 1, further comprising:
   a subject vehicle travel locus estimation device which estimates a travel locus of said subject vehicle based on detection results of said running state detection device; and
   a lateral deviation calculation device which calculates a lateral deviation of said oncoming vehicle relative to a travel locus of said subject vehicle, based on the travel locus of said subject vehicle estimated by said subject vehicle travel locus estimation device and the relative position detected by said object detection device, wherein
   said departure determination device determines whether or not said subject vehicle has departed from the appropriate route for said subject vehicle, or said oncoming vehicle has departed from the appropriate route for said oncoming vehicle, by determining whether or not the lateral deviation calculated by said lateral deviation calculation device occurs on a side approaching the travel locus of said subject vehicle, or whether or not said lateral deviation occurs on a side away from the travel locus of said subject vehicle.

4. The vehicle departure determination apparatus according to claim 3, wherein said departure determination device
   determines that said oncoming vehicle has departed from the appropriate route for said oncoming vehicle, when said lateral deviation occurs on the side approaching the travel locus of said subject vehicle, and changes in a reducing trend over time, and
   determines that said subject vehicle has departed from the appropriate route for said subject vehicle, when said lateral deviation occurs on the side away from the travel locus of said subject vehicle, and changes in a reducing trend over time.

5. The vehicle departure determination apparatus according to claim 1, further comprising a driver state estimation device which estimates a state of a driver of said subject vehicle, wherein
   said departure determination device determines that said oncoming vehicle has departed from the appropriate route for said oncoming vehicle, when the state of said driver estimated by said driver state estimation device is normal, and determines that said subject vehicle has departed from the appropriate route for said subject vehicle, when the state of said driver estimated by said driver state estimation device is not normal.

6. The vehicle departure determination apparatus according to claim 1, further comprising a subject vehicle turning state detection device which detects a turning state of said subject vehicle based on detection results of said running state detection device, wherein
   said departure determination device is set so that in the turning state of said subject vehicle detected by said subject vehicle turning state detection device,
   a determination is more readily made that said subject vehicle has departed from the appropriate route for said subject vehicle, as a degree of turning in a direction approaching said oncoming vehicle increases, and
   a determination is more readily made that said oncoming vehicle has departed from the appropriate route for said oncoming vehicle, as a degree of turning in a direction away from said oncoming vehicle increases.

7. The vehicle departure determination apparatus according to claim 1, wherein
   said contact avoidance device, when said departure determination device has determined that said oncoming vehicle has departed from said appropriate route, either suppresses said contact avoidance operation in comparison to cases when such a determination is not made, or prohibits said contact avoidance operation.

* * * * *